United States Patent
Nagata et al.

(10) Patent No.: US 6,638,388 B2
(45) Date of Patent: Oct. 28, 2003

(54) LAMINATING FILM AND LAMINATING METHOD USING IT

(75) Inventors: Toru Nagata, Tokyo (JP); Kenji Suzuki, Kanagawa (JP); Tetsu Iwata, Kanagawa (JP); Hiroshi Ochiai, Kanagawa (JP); Yoshinari Yasui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/924,451

(22) Filed: Aug. 9, 2001

(65) Prior Publication Data

US 2002/0059978 A1 May 23, 2002

(30) Foreign Application Priority Data

Aug. 11, 2000 (JP) ......................................... 2000-244552

(51) Int. Cl.⁷ .......................... B44C 1/165; B41M 3/12; B41M 7/00; B32B 9/00; B32B 7/02
(52) U.S. Cl. ...................... 156/230; 156/234; 156/239; 156/242; 427/147; 427/148; 428/42.3; 428/195; 428/205; 428/343; 428/347; 428/355 AC; 428/914
(58) Field of Search ................................ 156/230, 231, 156/234, 239, 240, 241, 242, 247, 277, 288, 272.2; 427/146, 147, 148, 388.4; 428/46.1, 41.8, 41.7, 42.3, 195, 205, 343, 347, 356, 355 AC, 914

(56) References Cited

U.S. PATENT DOCUMENTS

| | | | |
|---|---|---|---|
| 4,121,956 A | * 10/1978 | Sample | 156/80 |
| 4,528,311 A | 7/1985 | Beard et al. | 524/91 |
| 4,611,061 A | 9/1986 | Beard et al. | 548/260 |
| 5,206,302 A | * 4/1993 | Kohsaka et al. | 525/316 |
| 5,344,675 A | * 9/1994 | Snyder | 427/388.4 |
| 5,376,434 A | * 12/1994 | Ogawa et al. | 428/195 |
| 5,512,126 A | * 4/1996 | Kannabiran et al. | 256/380.9 |
| 5,877,111 A | * 3/1999 | Bennett et al. | 503/227 |
| 6,300,045 B2 | * 10/2001 | Lobo et al. | 430/496 |

FOREIGN PATENT DOCUMENTS

| | | |
|---|---|---|
| JP | 6-73368 | 3/1994 |
| JP | 6-91767 | 4/1994 |
| JP | 7-126536 | 5/1995 |
| JP | 9-118720 | 5/1997 |
| JP | 11-348199 | 12/1999 |
| JP | 2000-44901 | 2/2000 |

* cited by examiner

Primary Examiner—J. A. Lorengo
(74) Attorney, Agent, or Firm—Fitzpatrick, Cella, Harper & Scinto

(57) ABSTRACT

A laminating film has at least a surface layer and an adhesive layer deposited on a substrate, wherein the surface layer is provided by applying a coating made by blending together at least two types of emulsions. Emulsion polymers included in the emulsions may have different glass transition temperatures. A laminating method using the laminating film includes the steps of press-bonding the laminating film to a printed matter at a temperature not less than the glass transition temperature of the emulsion polymer with the higher glass transition temperature, and separating the laminating film from the printed matter thereafter.

13 Claims, 4 Drawing Sheets

LAMINATING FILM AND LAMINATING METHOD USING IT

BACKGROUND OF THE INVENTION

1. Field of the invention

The present invention relates to a laminating film for forming a protective layer on a printed matter and a method using this laminating film. Particularly, it relates to a laminating film and a laminating method for hot-press-bonding to the printed matter the protective layer formed on a substrate and then stripping off the substrate to form the protective layer on the printed matter.

2. Related Backgroud of Art

Hitherto, methods have been widely used in which a transparent resin layer coated on a heat-resistant substrate is hot-pressed-bonded to an output print of electrophotography and ink jet. As disclosed in Japanese Patent Application Laid-Open No. 6-91767, for example, there are also methods in which a laminating film having a protective layer is bonded to the printed matter, and the protective layer alone is transferred onto the surface of the printed matter. In this case, for methods for coating the protective layer on the laminating film substrate, usually a coating having a polymer dissolved in a solvent is applied, or a coating with resin particles dispersed in a solvent is applied as an emulsion, and is dried.

On the other hand, Japanese Patent Application Laid-Open No. 2000-44901 discloses a technique of incorporating an ultraviolet absorbing molecular structure in a polymer constituting a protective resin layer to form a chemically stable ultraviolet absorbing layer. The resin disclosed as an embodiment in this patent publication remains solid on the polycarbonate substrate, but on the paper substrate, the resin of such formulation cannot bear paper stretch during moisture uptake, resulting in cracking.

In the conventional arts described above, two mutually contradictory requirements that only the protective layer bonded to the printed matter should be able to be cut accurately at the edge of the printed matter and that the protective layer should not be cracked with enlargement in size of the printed matter due to moisture uptake can not be satisfied at the same time.

SUMMARY OF THE INVENTION

An object of the present invention is to provide a laminating film such that when a laminating film and a printed matter are laminated together and a heat resistant substrate is then removed, a protective layer is cut accurately at the edge of the printed matter, and the protective layer is not subjected to cracking even if the printed matter takes up moisture, and a laminating method using this laminating film.

The laminating film of the present invention has at least a surface layer and an adhesive layer coated on a substrate, in which the above described surface layer is formed by applying coatings prepared by mixing together at least two types of emulsions.

Also, the laminating method of the present invention, which uses a laminating film coated with coatings prepared by two or more types of emulsions which are comprised of emulsion polymers different in glass transition temperature from each other, comprises a step of press-bonding the above described laminating film to a printed matter at a temperature higher than or equal to the glass transition temperature of the emulsion polymer with relatively high glass transition temperature, and a step of separating the substrate of the above described laminating film from the above described printed matter thereafter.

DESCRIPTION OF THE PREFERRED EMBODIMENTS

Figure 1:
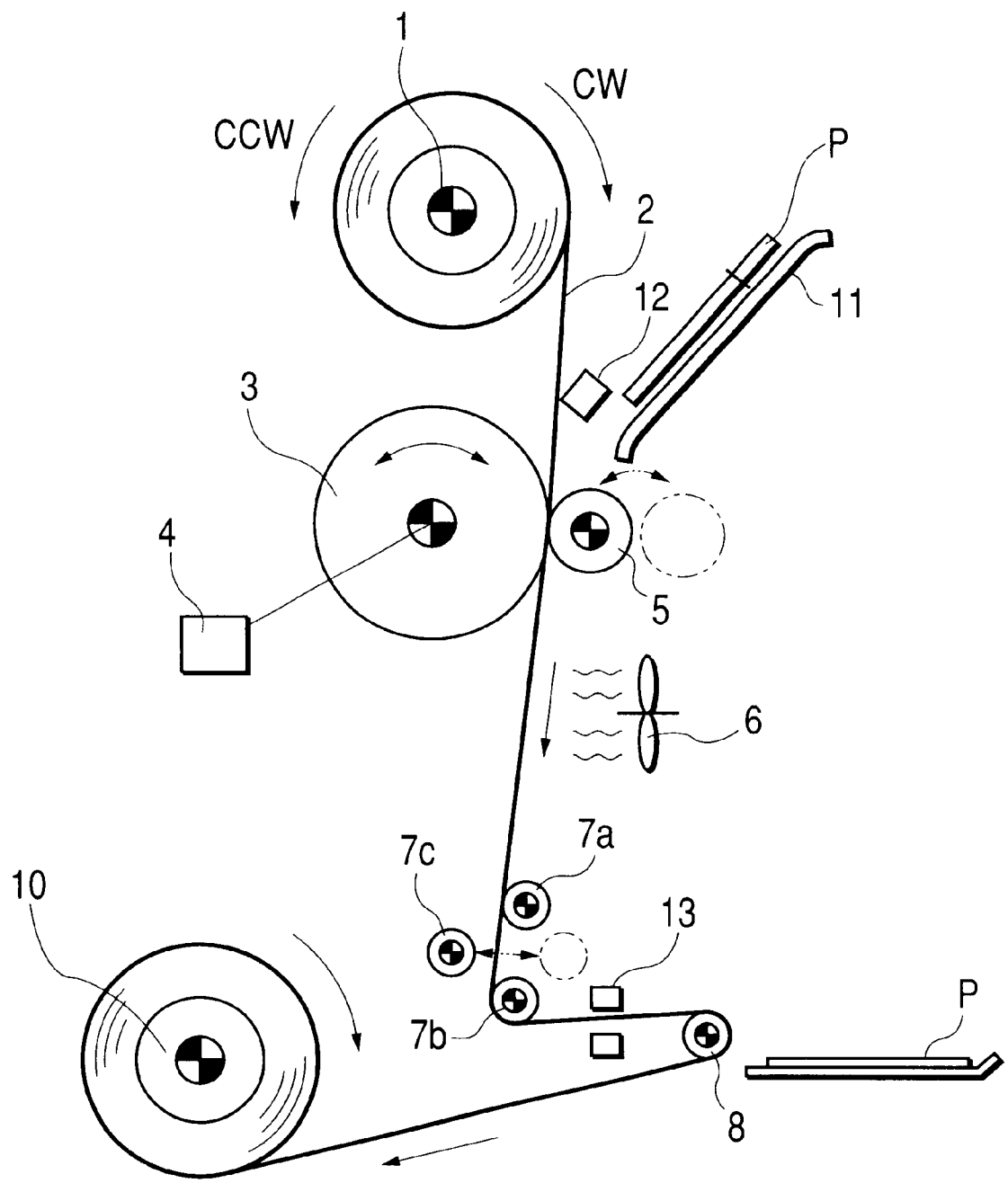
FIG. 1 is a schematic diagram showing one example of a laminating machine using a laminating film of the present invention.

In FIG. 1, reference numeral 1 denotes a feed reel for a roll of laminating film 2 of the present invention wound up with the protective layer being the outer surface, which gives back tension to a film 2 (by torque in the direction of CCW in FIG. 1). Reference numeral 3 denotes a heating roll, which has on its central axis a rotary encoder 4 for detecting rotation quantity of the roll. Reference numeral 5 denotes a press roll for pressing the film 2 against the heating roll, and its pressure is desirably 5 to 50 N/cm in linear pressure, particularly desirably 15 to 35 N/cm in linear pressure.

Reference numeral 6 denotes a cooling fan for cooling the laminating film 2 and a printed matter P pressed against each other by the rolls 3 and 5, and reference numerals 7a and 7b denote guide rolls of a rear end stripping portion, which are axially rotatable. Reference numeral 7c denotes a movable stripping roll of the rear end stripping portion, which strips the printed matter P from the film 2 by rapidly pressing the rear end of the printed matter P press-bonded to the film 2 via the protective layer. Reference numeral 8 denotes a guide roll of the leading end stripping portion, and the printed matter P press-bonded to the film 2 via the protective layer is passed through this roll 8, whereby the printed matter P is stripped off at the leading end due to a difference in rigidity between the printed matter P and the film 2. Reference numeral 10 denotes a takeup reel for the laminating film 2, which gives tension in the windup direction. Reference numeral 11 denotes a guide of the printed matter P, reference numeral 12 denotes a photo interrupter constituting a first paper passage sensor, and reference numeral 13 denotes a photo interrupter constituting a second paper passage sensor.

When the printed matter P is inserted into the guide 11 and the first paper passage sensor 12 generates a printed matter P "existence" signal, the press roll 5 abuts against the heating roll 3, and the heating roll 3 starts rotating in the CW direction. The linear speed of such rotation can be selected from the range of about 5 mm/s to 40 mm/s, but preferably selected from the range of 10 mm/s to 30 mm/s. The printed matter P is bonded to the laminating film 2 via the protective layer by the rolls 3 and 5. The rotary encoder 4 monitors the angular position of the heating roll 3 starting with the angular position when the first paper passage sensor 12 detects a change from "existence" to "not existence" of the printed matter P and ending with the angular position when the rear end of the printed matter is placed in the rear end stripping portion, and stripping at the rear end is carried out by the movable stripping roll 7c of the rear end stripping portion. Thereby, the printed matter P is stripped off only at the rear end part from the laminating film 2 together with the protective layer. Thereafter, the second paper passage sensor 13 detects the "not existence" of the printed matter P, and then the laminating film 2 is fed by the length needed for completion of discharging the paper. This is also carried out by the encoder 4 monitoring the rotation of the heating roll 3, which is equivalent to the distance over which the film is fed after the passage of the rear end of the printed matter P through the second sensor 13 and until the completion of discharging the paper. At this time, the printed matter P is bent rapidly because it is passed through the leading end stripping portion, and as will be described later, the printed matter P having high rigidity and the protective layer bonded to the printed matter P are stripped from the laminating film.

At this time, the laminating film 2 between the position of the roll 3 and the leading end stripping portion has no printed matter bonded thereto, and thus can be reused. After this unused part is rewound, the press roll 5 returns to the non-press position.

Figure 2:
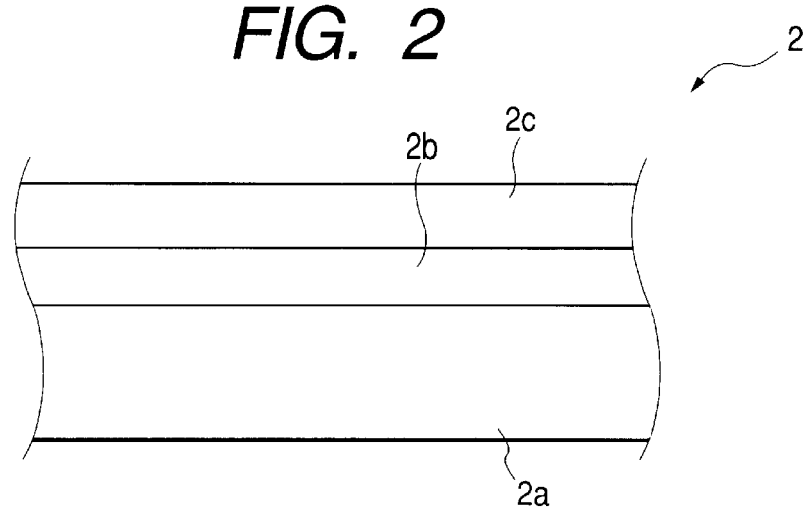
FIG. 2 is a sectional view showing one example of the laminating film of the present invention.

FIG. 2 is a sectional view of the laminating film of the present invention. The laminating film 2 has a protective layer on the heat resistant substrate 2a. The protective layer has at least a surface layer 2b and an adhesive layer 2c deposited one after another on the substrate 2a.

For the substrate 2a, which may include any materials allowing the protective layer to be easily stripped off when the protective layer of the laminating film 2 is bonded onto the ink accepting layer of the printed matter P, films and sheets comprised of materials including polyesters such as polyethylene terephthalate, polyethylene terephthalate-isophthalate copolymer and polybutylene terephthalate, polyolefin such as polypropylene, polyamide, polyimide resin, triacetyl cellulose, polyvinyl chloride, vinyliden chloride-vinyl chloride copolymer resin, acrylic resin, polyether sulfone may be used. The thickness of the substrate 2a is not particularly limited, but it is preferably in the range of 5 to 50 $\mu$m, more preferably in the range of 10 to 40 $\mu$m, considering cost effectiveness and resistance to wrinkles.

The surface of the substrate 2a on which the protective layer is to be formed may be subjected to surface roughing such as embossing and sandblasting, or surface roughing with a resin layer including fine particles. In the case where surface roughing is not performed, glossy images having the protective layer can be obtained when the substrate film is stripped off after the laminating film and the printed matter are bonded together, but by performing this surface roughing, semi-glossy or matted images can be obtained.

The surface layer of the protective layer is formed by applying a dispersed system prepared by blending at last two types of emulsion polymers. For polymeric substances comprised in the emulsion for use in the present invention, resins such as acrylic resin, styrene resin, vinyl chloride resin and vinyl acetate resin or copolymer resins thereof are used. For two or more types of polymeric substances that are blended together, two types of polymeric substances different form each other in glass transition temperature (Tg) or minimum formation temperature (MFT) are preferable. Preferable is an emulsion having a polymeric substance with Tg being higher than or equal to 80° C. and a polymeric substance with Tg being lower than or equal to 30° C.

For acrylic resins, (meta)acrylate alone or a copolymer thereof is used.

Specific examples of (meta)acrylates may include methyl (meta)acrylate, ethyl(meta)acrylate, isopropyl(meta)acrylate, n-butyl(meta)acrylate, n-hexyl(meta)acrylate, n-oxyl(meta)acrylate, 2-ethyl hexyl(meta)acrylate, isononyl (meta)acrylate and lauryl(meta)acrylate. These (meta)acrylates may be used alone or as combinations. Monomers that can be further co-polymerized with these (meta)acrylates may include unsaturated carbonic acids such as (meta)acrylic acid, crotonic acid, maleic acid, fumaric acid, itaconic acid; monomers having hydroxyl groups such as hydroxylethyl(meta)acrylate, hydroxylpropyl(meta)acrylate, hydroxylbutyl(meta)acrylate; monomers having alkoxy groups such as methoxyethyl(meta)acrylate and ethoxyethyl(meta)acrylate; monomers having glycidyl groups such as glycidyl(meta)acrylate and aryl glycidyl ether; monomers having (meta)acrylonitrile groups; monomers having aromatic rings such as styrene, phenyl(meta)acrylate and benzyl(meta)acrylate; monomers having amide groups such as (meta)acrylamide; monomers having N-alcoxy groups and N-alcoxyalkyl groups such as N-methoxymethyl(meta)acrylamide and N-methoxyethyl (meta)acrylamide; monomers having N-alkylol groups such as N-methylol (meta) acrylamide and N-butylol(mata)acrylamide; monomers having groups with halogen atoms bonded thereto, such as vinyl chloride, vinyl bromide, aryl chloride, 2-chloroethyl(meta)acrylate, uroromethyl styrene and vinyl fluoride; and olefin monomers such as ethylene, propylene and butadiene. Partial cross-linking is also possible using the reactive groups of the materials shown above.

Emulsions for use in the present invention may be synthesized using techniques that are widely known, and needless to say, commercially available materials can be used for those emulsions. Tg of the resin that is used for the emulsion can be adjusted by changing monomer components and the ratios thereof.

For emulsions comprised of polymeric substances with Tg or MFT being the higher, those using methacrylate resin of which an elongation is not high are particularly suitable. For emulsions comprised of polymeric substances with Tg or MFT being the lower, resins using a large amount of acrylate monomer having low Tg are particularly suitable.

For emulsions comprised of polymeric substances with Tg or MFT being the higher, one type of emulsion comprised of resin with Tg higher than or equal to 80° C. may be used, or a plurality of emulsions comprised of resins with Tg higher than or equal to 80° C. may be blended together and used.

For emulsions comprised of polymeric substances with Tg or MFT being the lower, one type of emulsion comprised of resin with Tg lower than or equal to 30° C. may be used, or a plurality of emulsions comprised of resins with Tg lower than or equal to 30° C. may be blended together and used.

A blend of an emulsion having such a polymeric substance with relatively high Tg (HTgE) and an emulsion having such a polymeric substance with relatively low Tg (LTgE) is used for the surface protective layer of the present invention. If the total solid content of emulsions is considered as 100 parts by weight (hereinafter "part" and "%" means "part by weight" and "% by weight"), the solid content of HTgE is 10 to 90 parts, preferably 40 to 80 parts. The solid content of LTgE is 10 to 90 parts, preferably 20 to 60 parts.

Formation of emulsion layers can be carried out by applying coating solutions including emulsions using the roll coating, rod bar coating, spray coating, air knife coating, slot die coating or the like, and then drying the same. For the thickness of the surface layer, thickness large enough to prevent the situation in which cracking occur due to stress is required, but if it is too large, stripping performance along the perimeter of the print is impaired. Therefore, the thickness of the surface layer is preferably 1 to 10 μm.

The adhesive layer is formed on the surface layer as described above. The adhesive layer can also be obtained by applying and drying emulsion coatings, but resins that are adequately softened to keep high conformability with the print surface during hot-press-bonding are required. Resins that are used for emulsions for this adhesive layer include acrylic resin, vinyl acetate resin, vinyl chloride resin, ethylene/vinyl acetate copolymer resin, polyamide resin, polyester resin, polyurethane resin and polyolefin resin. Among them, acrylic resin adhesives are particularly preferable in terms of conformability with the surface of the printed matter and transparency of coatings.

For acryl monomers that are used for acrylic adhesives, alkyl ester monomers such as methyl acrylate, ethyl acrylate, propyl acrylate, isopropyl acrylate, butyl acrylate, isobutyl acrylate, pentyl acrylate, hexyl acrylate, heptyl acrylate, octyl acrylate, 2-ethylhexyl acrylate and nonyl acrylate, and alkoxyalkyl acrylates such as 2-ethoxyethyl acrylate and 3-ethoxypropyl acrylate.

Methacrylate monomers, vinyl acetate, styrene, acrylonitrile and (meta)acrylamide may be used as copolymer components as appropriate in adjusting cohesion of the adhesive layer. For another method for adjusting cohesion, there is the methods in which monomers containing hydroxyl groups such as 2-hydroxyethyl(meta)acrylate and 2-hydroxypropyl (meta)acrylate, and monomers containing carboxyl groups such as (meta)acrylic acid are introduced to use active hydrogen thereof for forming partial cross-linking with isocyanate, block isocyanate, epoxy and the like.

Since extreme increase in molecular weight due to cross-linking is not preferred in ensuring sharp cutting at the edge of the protective layer laminated with the printed matter, it is preferable that the content of linkable monomers is at most less than 10 Wt % of all monomers.

Also, for another method for adjusting cohesion, there is the method in which N-methylol acrylamide, N-methylol metacrylate, butoxymethyl acrylamide or the like is used to form cross-linking.

Emulsions for use in the present invention can be synthesized by widely known techniques as in the case of emulsions for surface layers, and needless to say, commercially available materials can be used as those emulsions. Tg or MFT of resins that are used for emulsions is dependent on monomer components, but it can be adjusted by changing monomer components and their ratios especially in the case of acrylic resin adhesives. The coating method is identical to that for the surface layer.

For the thickness of the adhesive layer, thickness required for ensuring that the adhesive layer is sufficiently bonded to the ink accepting layer of the recorded medium ultimately without causing air bubbles to occur should be provided. Therefore, suitable thickness is in the range of 2 to 30 μm, particularly preferably in the range of 4 to 20 μm. The lower limit is due to the above described reason, while the upper limit is associated with degradation of sharpness of images and increase in costs due to increase in the thickness of the entire protective layer.

Furthermore to prevent blocking between the substrate surface and the protective layer, a released paper may be used for the protective layer, or there is also a method in which the reverse surface of the substrate is subjected to release processing. The latter is the better in terms of cost effectiveness, and fluoro-resins, silicon resins and the like are used as releasing agents.

Recorded media capable of modifying their surfaces by such protective layers to provide excellent image quality may include ink jet recording media, heat sublimation recording media, electronic photograph recording media and photographs, and they may be formed as follows, for example.

Substrates of recorded media may include plastic films such as polyethylene and polyethylene terephthalate (PET), and sheets of papers such as woodfree paper, coated paper and laminated paper. For ink accepting layers that are applied onto the surface thereof, those coated with water-soluble polymeric emulsions such as polyvinyl alcohol, vinyl acetate, acryl and urethane and combinations thereof and coatings prepared by dispersing silica in the emulsions may be used. They are applied using as coating methods the roll coating method, rod bar coating method, spray coating method and slot die coating method, and are then dried, thereby recorded media can be obtained.

As described above, according to the present invention, the surface layer and adhesive layer of the laminating film can be sharply cut along the edge of the printed matter when the substrate of the laminating film is stripped off after the protective layer resistant to cracking is achieved and the laminating film is hot-press-bonded to the printed matter such as an ink jet and a photograph (critical point 1).

In addition, in the present invention, a laminating film capable of forming a highly light-resisting protective layer may be provided (critical point 2).

In order that the critical points 1 and 2 of the present invention are mutually compatible, an appropriate amount of ultraviolet absorbers are contained in any one of the surface layer and the adhesive layer. For materials to be added, the following compounds may be used.

1) 2-hydroxyphenylbenzotoriazole family
2) 2-hydroxybenzophenon family
3) 2,4-diphenyl-6-(2-hydroxyphenyl)-s-triazine family
4) salicilate family
5) cyanoacrylate Also, hydrogen of benzene rings having the above described base bones may be substituted with halogen atoms, alkyl groups, alkoxy groups, cyano groups, nitro groups, hydroxyl groups and the like. Low-molecular ultraviolet absorbers may cause degradation of performance due to volatilization and bleeding from the layer containing the absorber, and degradation of strength of polymeric coating film due to contained low-molecular materials, and thus it more desirable that ultraviolet absorbers to be used are polymers containing ultraviolet absorbing groups.

For polymerization, reactive groups should be introduced in the benzene cores of the above described ultraviolet absorbing base bones. Typical examples of such groups may include the following group of general formula (1).

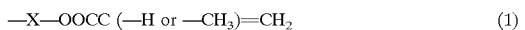

$$-X-OOCC(-H \text{ or } -CH_3)=CH_2 \tag{1}$$

Reactive monomers having introduced therein substituent groups as shown in formula (1) may be singly polymerized, or copolymers with other monomers capable of being copolymerized as described in the "resin of surface layer" of the present invention may be used. Furthermore, X in the formula (1) represents an alkylene group or oxyalkyl group having 1 to 12 carbon atoms, or a bivalent group such as —CH$_2$C (OH) CH$_2$—.

Resins having such ultraviolet absorbing groups are disclosed in the claims and Examples of:

Japanese Patent Application Laid-Open No. 6-73368 Ipposha Yushi Kogyo Co., Ltd.

Japanese Patent Application Laid-Open No. 7-126536 Ipposha Yushi Kogyo Co., Ltd.

Japanese Patent Application Laid-Open No. 9-118720 (U.S. Pat. Nos. 4,528,311, 4,611,061) IOLAB Corporation Japanese Patent Application Laid-Open No. 11-348199 Nippon Shokubai Co., Ltd.

Japanese Patent Application Laid-Open No. 2000-44901 Otsuka Chemical Co., Ltd.

Another method for improving the light resistance of the protective layer is to add photo stabilizers. The method of adding photo stabilizers is similar to the method of adding the ultraviolet absorber. Typical materials include materials of hindered amine family. It is more desirable that a resin emulsion having monomers including an appropriate amount of light stable groups contained in at least one of the high Tg resin, low Tg resin and adhesive layer resin is used, as in the case of the ultraviolet absorber. For example, reactive light stabilizers of piperidine family as disclosed in claims and Examples of Japanese Patent Application Laid-Open No. 11-348199 may be singly polymerized, or they may be used for copolymer resin emulsions with reactive ultraviolet absorbers and other monomers capable of being co-polymerized.

Figure 3A:
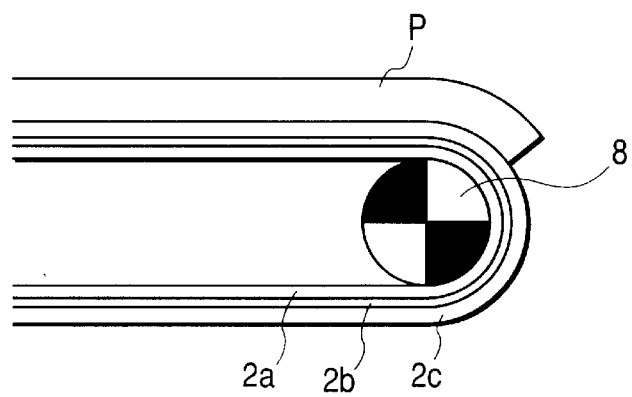
FIGS. 3A and 3B are partial views of leading end separation mechanisms showing a mechanism of cutting the protective layer of the laminating film of the present invention.
Figure 3B:
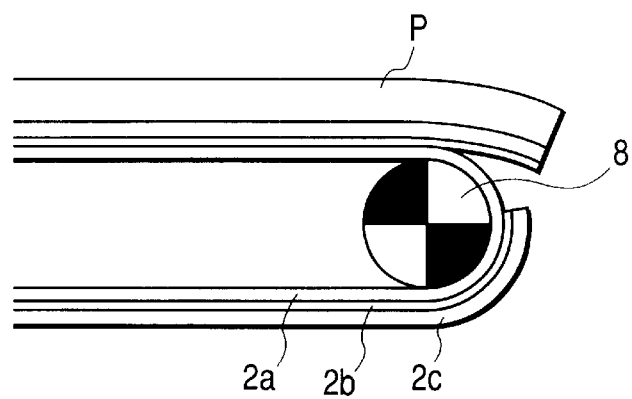

FIGS. 3A and 3B are magnified sectional views showing the leading end of the printed matter P passing through the leading end separation portion, when it is seen from the side. The substrate 2a of the laminating film 2 has its direction rapidly changed at the leading end separation portion by a roll 8 having small curvature (FIG. 3A). At this time, the printed matter P bonded to the adhesive layer 2c is going to separate from the substrate 2a due to its rigidity. At this time, the surface layer 2b comprising the protective layer cannot keep up with deformation and ruptures due to shearing, and subsequently the adhesive layer 2c with lower Tg or lower MFT also ruptures. Therefore, the resin comprised in the surface layer needs to have a property such that the layer ruptures in a brittle manner for deformation involving rapid shearing force.

Separation at the rear end occurs in accordance with a similar mechanism. If the movable stripping roll 7c of the rear end stripping portion rapidly pushes out the laminating film with the printed matter bonded thereto at between the guide rolls 7a and 7b, movement occurs in such a manner that the entire laminating film existing in the downstream of the rear end stripping portion is rewound against winding tension applied to the take-up reel 10, because the hot-press-bonding portion exists in the upstream of the laminating film pass. Consequently, if rear end stripping operation is performed after the rear end of the printed matter passes through the above described movable stripping roll 7c, the protective layer is destructed due to rigidity of the printed matter and a rapid change in pass direction at the rear end of the printed matter in accordance with a mechanism identical to that of stripping at the leading end, and as a result the printed matter is stripped off from the heat-resistant substrate 2a of the laminating film along with the protective layer.

Figure 4:
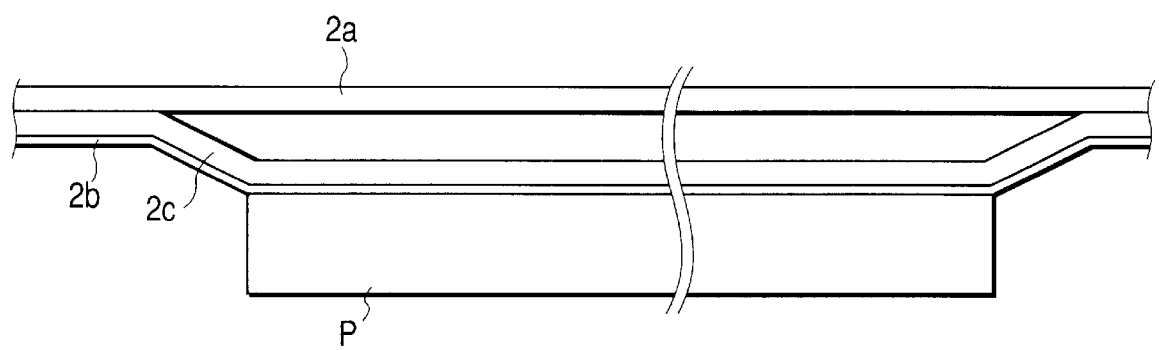
FIG. 4 is a partial view showing a mechanism of cutting the protective layer of the laminating film.

FIG. 4 is a sectional view showing a situation in which the printed matter passes through the leading end separation mechanism, and the both sides of the protective layer are cut, when it is seen from the printed matter's traveling direction. After separation of the leading end, the printed matter is going to travel in direction different from the traveling direction of the laminating film due to its rigidity. Thereby, the both sides of the protective layer are cut in succession to the leading end of the protective layer. For the cutting mechanism in this case, it is cut due to tensile stress as shown in FIG. 4 while the leading end is cut due to shearing. FIG. 4 shows a situation immediately after the cutting of the both sides of the protective layer is started, and the printed matter starts to separate from the substrate 2a along with the protective layer. At this time, the entire protective layer has tensile strength sufficiently smaller than adhesion of the surface layer 2b to the substrate 2a, whereby cutting occurs in proximity to the both sides of the printed matter. If the tensile strength is large relative to this adhesion, there may be cases where cutting occurs at a distance from the both sides of the printed matter after the protective layer located at a distance from the both sides of the printed matter is considerably separated from the substrate 2a. As a result, an excessive scale-like resin of the protective layer may remain in the perimeter of the printed matter. Therefore, it is preferable that the tensile strength of entire resin layers forming the protective layer is sufficiently smaller than adhesion of the protective layer to the substrate.

In addition, since the resin of the protective layer is bonded to the printed matter by a pair of rolls, residual tensile stress may occur due to adhesion. In addition, if the substrate of the printed matter is made of paper, it is stretched due to moisture uptake, and stress occurs due to the surface protective layer being pulled. In such a case, the surface of the protective layer may be cracked due to these stresses. For preventing such a situation, it is desirable that the tensile strength of the surface layer 2b is kept small while rupture elongation in the micro segment associated with cracking is kept large.

Figure 5:
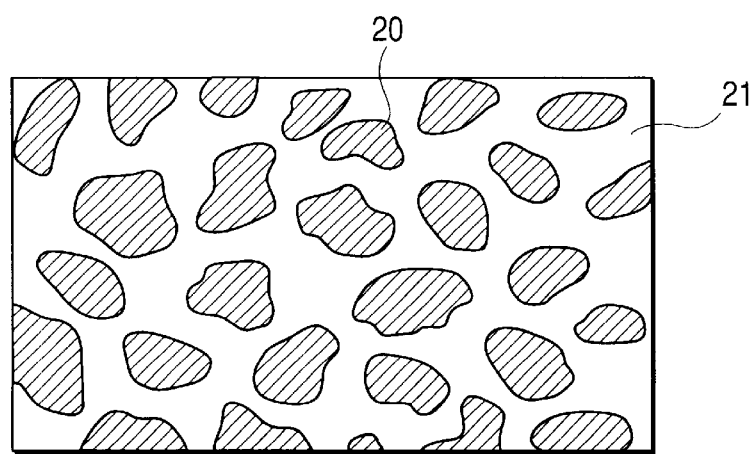
FIG. 5 is a partially magnified view showing the surface layer of the laminating film of the present invention.

FIG. 5 shows composition of resins comprised in the surface layer 2b of the protective layer. Since the layer is formed in such a manner that a first resin 20 with high Tg or high MFT and a second resin 21 with low Tg or low MFT are blended together as an emulsion, and are coated and dried on the substrate, the zones of the first resin 20 and the second resin 21 are gradually intermingled with each other after they are formed into film. More accurately, it is a structure such that islands of the first resin 20 that forms film at a higher temperature are formed in the sea of the second resin 21 that starts forming film at a lower temperature in the drying process. Due to such a structure, easier shearing, lower tensile strength and large rupture elongation in the micro segment are established at the same time in the low-molecular region. In addition, at this time, the temperature property such as strength of the film surface and sticking is stable up to the temperature near Tg of the first resin 20, due to contribution from the high-molecular region.

Figure 6:
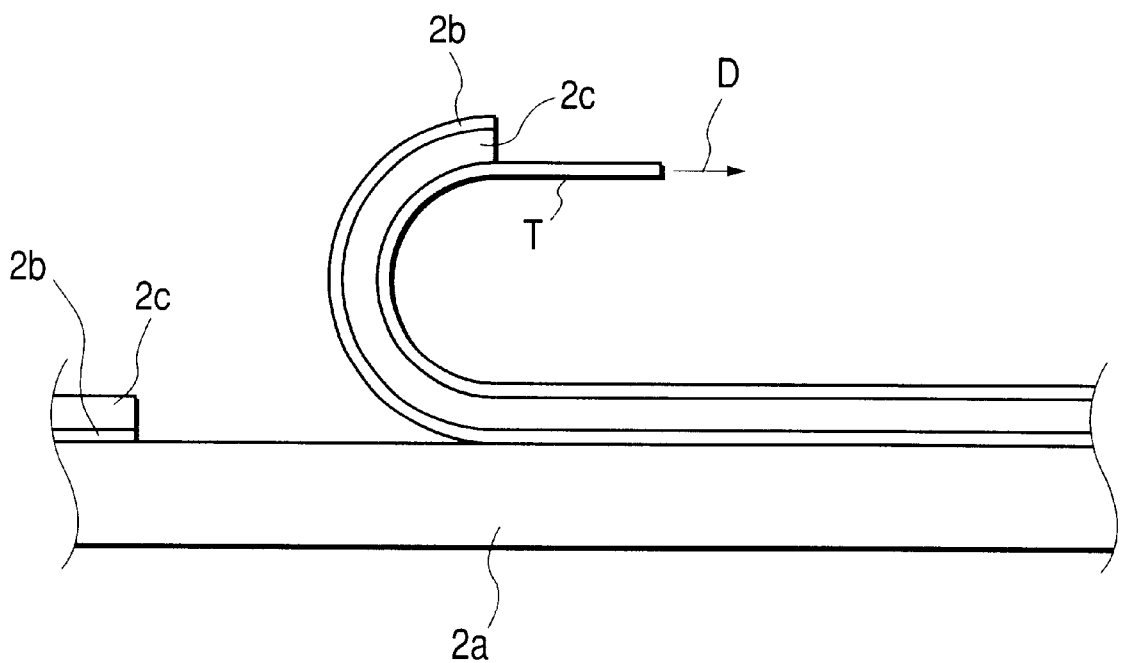
FIG. 6 is a partial view showing a method of measuring the adhesive strength between the protective layer of the laminating film and the substrate of the laminating film.
Figure 7:
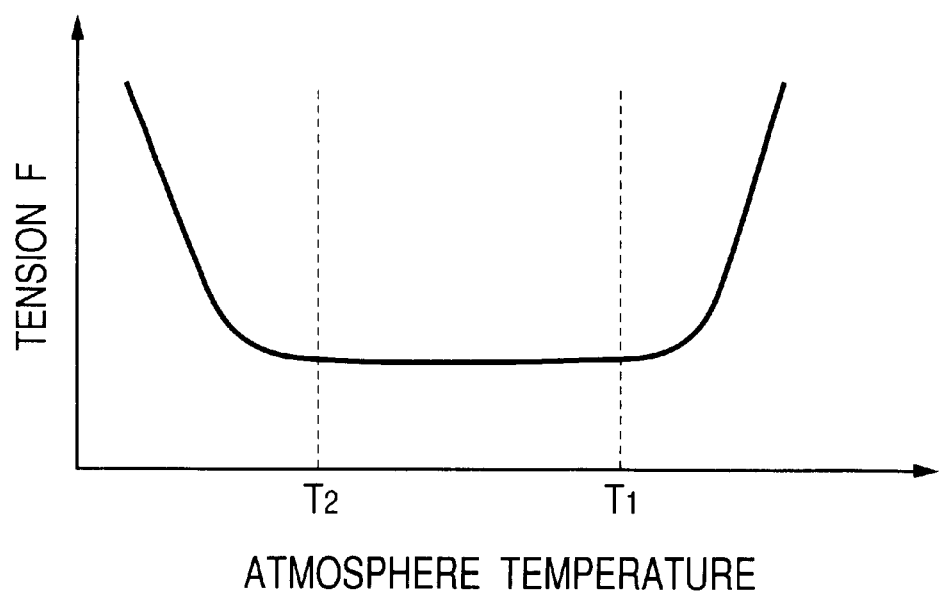
FIG. 7 is a graph showing atmosphere temperatures for the adhesive strength between the protective layer of the laminating film and the substrate of the laminating film.

In addition, FIG. 6 is a schematic diagram showing measurement of strength of adhesion of the surface layer 2b and the adhesive layer 2c to the heat-resistant substrate 2a, wherein tension F occurring in an adhesive tape T when the protective layer bonded to the adhesive tape T is pulled in the direction of arrow D at a constant speed V is measured. A graph obtained by plotting the tension F against the atmosphere temperature at the time of measurement is shown in FIG. 7.

The surface layer 2b adhered closely to the substrate 2a is comprised of the resin having Tg (Tg1) higher than a first predetermined temperature T1 and Tg (Tg2) lower than a second predetermined temperature 12, but adhesion is kept constant between T2 and T1, and the adhesion increases in the temperature range above T1 and in the temperature range below T2. This is due to the fact that the adhesion increased as the cohesion of the resin with lower Tg is increased when the temperature exceeds Tg2 decreases as the cohesion is lost when the temperature exceeds T2, and this adhesion does not increase until the resin with higher Tg acquires cohesion as the temperature exceeds Tg1.

In order that the front and rear ends of the printed matter with the protective layer hot-press-bonded thereto are separated from the substrate 2a, cohesion between the surface layer 2b and the substrate 2a should be small. Therefore, the temperature suitable for separation of the front and rear ends is preferably a temperature between T2 and T1.

Processes starting with hot-press-bonding and ending with separation are adapted for ensuring stable operations in the normal range of room temperature variation, namely between about 10° C. and 30° C. In addition, adaptation is made so that stable operations are ensured immediately after the power is turned on and until thermal equilibrium is achieved in the cabinet of the mechanism. Therefore, a difference between T1 and T2 is preferably at least 40° C.

For stabilizing the hot-press-bonding process under, for example, the speed of 25 mm/s, the temperature the hot-press-bonding process is desirably 160° C. or higher. At this time, the temperature of the printed matter coming from the roll pair for hot-press-bonding is rapidly decreased, but the above described separation process can be stabilized by performing separation of the front and rear ends at a temperature between 30° C. and 80° C. Therefore, more preferably, T1 is 80° C. or higher and T2 is 30° C. or lower.

EXAMPLES

Example 1

1. Preparation of Laminating Film (1) Surface Layer Coating Solution (Coating Solution S1)

(a) Synthesis of High Tg Resin Emulsion

A first glass reaction container was provided with a stirrer, a reflux cooling pipe, a thermometer and a pipe for introduction of nitrogen gas, and thereafter 6 g of Aquaron RN-30 (manufactured by Daiichi Kogyo Seiyaku Co., Ltd.) as a nonionic emulsifier, 6 g of Aquaron HS-30 (manufactured by Daiichi Kogyo Seiyaku Co., Ltd.) as an anionic emulsifier, 119.0 g of methyl metaacrylate, 22.3 g of ethyl acrylate, 7.4 g of methacrylic acid and 156 g of water were added therein and stirred to prepare total 316.7 g of mixture. Then, 36 g of this mixture was taken out and put in a similar second reaction container, followed by carrying out emulsification for 40 minutes at 73° C. under introduction of nitrogen gas. Then, 17 g of ammonium peroxodisulfate was dissolved in 36 g of water as a polymerization initiator, and was added in the above described emulsion. Thereafter, the remaining amount of the above described mixture was taken from the first reaction container 1 and was dropped in the second reaction container for 100 minutes, and then polymerization was carried out at 73° C. After the remaining mixture was dropped completely, the mixture was stirred continuously at 73° C. for 80 minutes to synthesize a high Tg resin emulsion (Tg: 82° C., solid content of resin 47.0%). The average size of this dispersed particle was 80 nm.

(b) Synthesis of Low Tg Resin Emulsion

A low Tg resin emulsion (Tg: 27° C., solid content of resin 47.0%) was synthesized under conditions identical to those for the high Tg resin emulsion except that 74.4 g of ethyl acrylate, 29.8 g of methyl metaacrylate, 37.2 g of 2-hydroxyethyl metaacrylate and 7.4 g of methacrylic acid were used as materials of polymeric substances comprised in the emulsion. The average size of this dispersed particle was 87 nm.

(c) Preparation of Surface Layer Coating Solution 60 parts by weight (solid content) of the above described high Tg resin emulsion (Tg: 82° C.), 40 parts by weight (solid content) of the above described low Tg resin emulsion (Tg: 27° C.) and water were added, and they were mixed and stirred to prepare a coating solution S1 of which total solid content was 40%.

(2) Adhesive Layer Coating Solution (Coating Solution A1)

(a) Synthesis of Adhesive Resin Emulsion

An adhesive layer resin emulsion (Tg: 1° C., solid content 47.0%) was synthesized just as in the case of synthesis of the high Tg resin emulsion of the surface layer coating solution except that 111.6 g of ethyl acrylate, 14.9 g of methyl metaacrylate, 14.9 g of 2-hydroxyethyl metaacrylate and 7.4 g of methacrylic acid were used as materials of polymeric substances comprised in the emulsion. The average size of this dispersed particle was 100 nm.

(b) Preparation of Adhesive Layer Coating Solution

Water was added to the above described adhesive resin emulsion, and they were stirred to prepare a coating solution A1 of which solid content was 40%.

(3) Preparation of Laminating Film

A PET film with thickness of 38 μm was coated with the coating solution S1 by the slot die coating method, and was dried so that 5 μm of dry thickness was obtained. The coating solution A1 was coated thereon and dried so that 8 μm of dry thickness was obtained, thereby preparing a laminating film.

2. Preparation of Ink Jet Image Reception Paper and Printed Matter 100 parts by weight of emulsion (product name: NS-120XK) manufactured by Takamatsu OIL & FAT Co., Ltd. as a binder were mixed and dispersed in 160 parts by weight of synthesized silica (product name: Finesil X60) manufactured by Tokuyama Corp. to prepare a coating solution of which solid content was 18%, and a woodfree paper of 186 g/m$^2$ was coated with the coating solution and dried by a slot die coater so that 50 μm of coating thickness was obtained after drying. An image was formed on the A4 size ink jet image reception paper prepared in this way using H-100 Printer manufactured by Canon Inc.

3. Lamination Processing of Printed Matter Using Apparatus in FIG. 1

The protective layer of the laminating film produced as described above was deposited on this ink jet printed matter, and was heated to 140° C. from the substrate film side of the laminating film with a steel roll of 80 mm in diameter, and pressure was applied from the image reception paper side with a rubber roll of 50 mm in diameter. At this time, the nip load was 120 N, and the feed speed was 25 mm/sec. In this way, a printed matter with a protective layer deposited thereon was prepared. The cutting property of the cut protective layer was examined, and the finished printed matter was left at 60° C. for two hours (condition 1), and then was left at 30° C. and 90% RH for one week (condition 2) to perform accelerated tests for cracking of the surface layer. Evaluation results are shown in Table 1.

Example 2

1. Surface Layer Coating Solution (Coating Solution S2)

(a) Synthesis of High Tg Resin Emulsion

A high Tg resin emulsion (Tg: 100° C., solid content 47.0%) was synthesized just as in the case of synthesis of the high Tg resin emulsion of Example 1 except that 133.9 g of methyl metaacrylate, 7.4 g of ethyl acrylate and 7.4 g of methacrylic acid were used as materials of polymeric substances comprised in the emulsion. The average size of this dispersed particle was 96 nm.

(b) Synthesis of Low Tg Resin Emulsion

A low Tg resin emulsion (Tg: 11° C., solid content 47.0%) was synthesized just as in the case of synthesis of the high Tg resin emulsion of Example 1 except that 29.8 g of methyl metaacrylate, 96.7 g of ethyl acrylate, 7.4 g of methacrylic acid and 14.9 g of 2-hydroxyethyl methacrylate were used as materials of polymeric substances comprised in the emulsion. The average size of this dispersed particle was 105 nm.

(c) Preparation of Surface Layer Coating Solution 50 parts by weight (solid content) of the above described high Tg resin emulsion (Tg: 100° C.), 50 parts by weight (solid content) of the above described low Tg resin emulsion (Tg: 11° C.), and water were added, and they were mixed and stirred to prepare a coating solution S2 of which total solid content was 40%.

(2) Adhesive Layer Coating Solution (Coating Solution A2)

(a) Preparation of Adhesive Layer Resin Emulsion

An adhesive layer resin emulsion (Tg: −11° C., solid content 47.0%) was synthesized just as in the case of synthesis of the high Tg resin emulsion of Example 1 except that 119.0 g of ethyl acrylate, 7.4 g of propyl acrylate and 22.3 g of methyl metaacrylate were used as materials of polymeric substances comprised in the emulsion. The average size of this dispersed particle was 87 nm.

(b) Preparation of Adhesive Layer Coating Solution

Water was added to the above described adhesive layer resin emulsion, and they were stirred to prepare an adhesive layer coating solution A2 of which solid content was 40%.

(3) Preparation of Laminating Film

A PET film with thickness of 38 $\mu$m was coated with the coating solution S2 by the slot die coating method, and was dried so that 7 $\mu$m of dry thickness was obtained. The coating solution A2 was coated thereon and dried so that 12 $\mu$m of dry thickness was obtained, thereby preparing a laminating film.

2. Preparation of Ink Jet Image Reception Paper and Printed Matter

An ink jet image reception layer was formed on a wood-free paper of 210 g just as in the case of Example 1, followed by preparing a printed matter.

3. Lamination Processing of Printed Matter and Property Evaluation

The above described ink jet image reception paper and the above described laminating film are used to perform lamination processing and property evaluation as in the case of Example 1. Evaluation results are shown in Table 1.

Comparative Example 1

A high Tg resin and a low Tg resin having same monomer compositions as Example 1 were subjected to solution polymerization, followed by preparing a coating solution with the same solid content as Example 1 to a surface layer having same thickness as Example 1 on the substrate same as that of Example 1. The aqueous emulsion adhesive coating solution A1 same as that of Example 1 was coated thereon and dried, followed by forming am adhesive layer having same thickness to prepare a laminating film.

A printed matter was prepared on the same ink jet image reception paper as Example 1 as with Example 1, followed by performing lamination processing and property evaluation as with Example 1 using this printed matter and the above described laminating film. Evaluation results are shown in Table 1.

Comparative Example 2

A high Tg resin and a low Tg resin having same monomer compositions as Example 2 were subjected to solution polymerization, followed by preparing a coating solution with the same solid content as Example 2 to a surface layer having same thickness as Example 2 on the substrate same as that of Example 2. The aqueous emulsion adhesive coating solution A2 same as that of Example 2 was coated thereon and dried, followed by forming am adhesive layer having same thickness to prepare a laminating film.

A printed matter was prepared on the same ink jet image reception paper as Example 2 as with Example 2, followed by performing lamination processing and property evaluation as with Example 2 using this printed matter and the above described laminating film. Evaluation results are shown in Table 1.

TABLE 1

| | Surface layer | | Property evaluation | | |
| --- | --- | --- | --- | --- | --- |
| | High Tg resin | Low Tg resin | Cutting of protective layer | Cracks Condition 1 | Cracks Condition 2 |
| Example 1 | Emulsion | Emulsion | Good | Not found | Not found |
| Example 2 | Emulsion | Emulsion | Good | Not found | Not found |
| Comparative Example 1 | Solution polymerization | Solution polymerization | Good | Found | Found |
| Comparative Example 2 | Solution polymerization | Solution polymerization | Good | Found | Found |

Example 3

Coating solution 1: 60 parts by weight (solid content) of Acrylic Emulsion T371 manufactured by JSR Corporation (Tg=85° C.) as a high Tg emulsion and 40 parts by weight (solid content) of Acrylic Emulsion 2706 manufactured by Nissin Chemical Industry Co., Ltd. (Tg=14° C.) as a low Tg emulsion were mixed and dispersed to prepare a coating solution of which solid content was 38%.

Coating solution 2: Acrylic Emulsion 2706 manufactured by Nissin Chemical Industry Co., Ltd. (Tg=14° C., solid content 40%)

Substrate: PET with thickness of 38 $\mu$m

The substrate was first coated with the coating solution 1 by the slot die coating method, and was dried so that 5 $\mu$m of dry thickness was obtained, and thereafter the coating solution 2 was coated thereon and dried so that 8 $\mu$m of dry thickness was obtained to obtain a laminating film.

Example 4

Coating solution 3: 60 parts by weight (solid content) of Acrylic Emulsion T371 manufactured by JSR Corporation as a high Tg emulsion (Tg=85° C.) and 40 parts by weight (solid content) of Emulsion Type Polymer Ultraviolet Absorber UVA-383MG manufactured by BASF AG (Tg=27° C., self cross-linking type emulsion containing 30% of benzophenon ultraviolet absorbing monomer) were mixed and dispersed to prepare a coating solution of which solid content was 32%.

Coating solution 2: Acrylic Emulsion 2706 manufactured by Nissin Chemical Industry Co., Ltd. (Tg=14° C., solid content 40%)

Substrate: PET with thickness of 38 $\mu$m

The substrate was first coated with the coating solution 3 by the slot die coating method, and was dried so that 5 $\mu$m of dry thickness was obtained, and thereafter the coating solution 2 was coated thereon and dried so that 8 $\mu$m of dry thickness was obtained to obtain a laminating film.

Example 5

Coating solution 4: 60 parts by weight (solid content) of Acrylic Emulsion T371 manufactured by JSR Corporation as a high Tg emulsion (Tg=85° C.) and 40 parts by weight (solid content) of Copolymer Emulsion EUV-601 including monomers containing UV-stabilized groups manufactured by Nippon Shokubai Co., Ltd. (Tg=10° C.) were mixed and dispersed to prepare a coating solution of which solid content was 37%.

Coating solution 2: Acrylic Emulsion 2706 manufactured by Nissin Chemical Industry Co., Ltd. (Tg=14° C., solid content 40%)

Substrate: PET with thickness of 38 $\mu$m

The substrate was first coated with the coating solution 4 by the slot die coating method, and was dried so that 5 $\mu$m of dry thickness was obtained, and thereafter the coating solution 2 was coated thereon and dried so that 8 $\mu$m of dry thickness was obtained to obtain a laminateing film.

Example 6

Coating solution 5: 30 parts by weight (solid content) of Acrylic Emulsion T371 manufactured by JSR Corporation as a high Tg emulsion (Tg=80° C. or higher), 30 parts by weight (solid content) of Emulsion Type Ultraviolet Absorber ULS-1635MH manufactured by Ipposha Co., Ltd. (acrylic resin emulsion including monomers having benzotriazole ultraviolet absorbing groups, which contains 50% of monomers having ultraviolet absorbing groups) (Tg=85° C.), and 40 parts by weight (solid content) of Acrylic Emulsion 2706 manufactured by Nisshin Chemical Industry Co., Ltd. (Tg=14° C.) as a low Tg emulsion were mixed and dispersed to prepare a coating solution of which solid content was 36%.

Coating solution 2: Acrylic Emulsion 2706 manufactured by Nissin Chemical Industry Co., Ltd. (Tg=14° C., solid content 40%)

Substrate: PET with thickness of 38 $\mu$m

The substrate was first coated with the coating solution 5 by the slot die coating method, and was dried so that 5 $\mu$m of dry thickness was obtained, and thereafter the coating solution 2 was coated thereon and dried so that 8 $\mu$m of dry thickness was obtained to obtain a laminating film.

Example 7

Coating solution 6: 30 parts by weight (solid content) of Acrylic Emulsion T371 manufactured by JSR Corporation as a high Tg emulsion (Tg=85° C.), 30 parts by weight of Emulsion Type Ultraviolet Absorber ULS-635MH manufactured by Ipposha Co., Ltd. (Tg=80° C., acrylic resin emulsion including monomers having benzophenone ultraviolet absorbing groups, which contains 50% of monomers having ultraviolet absorbing groups), and 40 parts by weight of Acrylic Emulsion 2706 manufactured by Nissin Chemical Industry Co., Ltd. (Tg=14° C.) were mixed and dispersed to prepare a coating solution of which solid content was 36%.

Coating solution 2: Acrylic Emulsion 2706 manufactured by Nissin Chemical Industry Co., Ltd. (Tg=14° C., solid content 40%)

Substrate: PET with thickness of 38 $\mu$m

The substrate was first coated with the coating solution 5 by the slot die coating method, and was dried so that 5 $\mu$m of dry thickness was obtained, and thereafter the coating solution 2 was coated thereon and dried so that 8 $\mu$m of dry thickness was obtained to obtain a laminating film.

Example 8

Coating solution 1: 60 parts by weight (solid content) of Acrylic Emulsion T371 manufactured by JSR Corporation as a high Tg emulsion (Tg=85° C.) and 40 parts by weight (solid content) of Acrylic Emulsion 2706 manufactured by Nissin Chemical Industry Co., Ltd. (Tg=14° C.) as a low Tg emulsion were mixed and dispersed to prepare a coating solution of which solid content was 38%.

Coating solution 7: 70 parts by weight (solid content) of Acrylic Emulsion 2706 manufactured by Nissin Chemical Industry Co., Ltd. (Tg=14° C.) and 30 parts by weight (solid content) of UVA-383MG manufactured by BASF AG were mixed and dispersed to prepare a solution of which solid content was 37%.

Substrate: PET with thickness of 38 $\mu$m The substrate was first coated with the coating solution 1 by the slot die coating method, and was dried so that 5 $\mu$m of dry thickness was obtained, and thereafter the coating solution 7 was coated thereon and dried so that 8 $\mu$m of dry thickness was obtained to obtain a laminating film.

Comparative Example 3

Coating solution 8: High Molecular Ultraviolet Absorber PUVA 30M manufactured by Otsuka Chemical Co., Ltd. (Tg=90° C., 30% toluene solution of acrylic resin including monomers having ultraviolet absorbing groups in which the content of monomers having benzotriazole ultraviolet absorbing groups is 30% of the whole) was dissolved in toluene to prepare a solution of which solid content was 25%.

Coating solution 2: Acrylic Emulsion 2706 manufactured by Nissin Chemical Industry Co., Ltd. (Tg=14° C., solid content 40%)

Substrate: PET with thickness of 38 $\mu$m

The substrate was first coated with the coating solution 8 by the slot die coating method, and was dried so that 5 $\mu$m of dry thickness was obtained, and thereafter the coating solution 2 was coated thereon and dried so that 8 $\mu$m of dry thickness was obtained to obtain a laminating film.

Comparative Example 4

Coating solution 9: Polyvinyl Chloride-Acetate Emulsion 602 manufactured by Nissin Chemical Industry Co., Ltd. (MFT=130° C., solid content 48%)

Coating solution 2: Acrylic Emulsion 2706 manufactured by Nissin Chemical Industry., Ltd. (Tg=14° C., solid content 40%)

Substrate: PET with thickness of 38 $\mu$m

The substrate was first coated with the coating solution 9 by the slot die coating method, and was dried so that 5 $\mu$m of dry thickness was obtained, and thereafter the coating solution 2 was coated thereon and dried so that 8 µm of dry thickness was obtained to obtain a laminating film.

A plurality of printed matters were made on the ink jet image reception paper same as that of Example 1 as in the case of Example 1. Thereafter, these printed matters and laminating films of Examples 3 to 8 and Comparative Examples 3 and 4 were used to perform lamination processing and property evaluation as in the case of Example 1.

As a result, in Examples 3 to 8, the protective layer was cleanly cut around the printed matter, and the protective layer did not overhang from the end of the printed matter. In addition, no cracks appeared on the surface of the protective layer after exposure to environments. In Examples, those having UV absorbers incorporated in resin components showed adequate UV cutting functions in which the drop rate of optical density was less than 30%, after exposure to Atlas Fade-meter for 100 hours.

In Comparative Example 3, the protective layer was cleanly cut at the ends of both sides in the traveling direction of the printed matter, but the protective layer was not cut at the front and back ends in the traveling direction of the printed matter. In addition, cracks appeared on the surface of the protective layer after exposure to environments of conditions 1 and 2.

In Comparative Example 4, the protective layer was cleanly cut at the front and back ends in the traveling direction of the printed matter, but it was not cleanly cut at the ends of both sides in the traveling direction of the printed matter, causing the protective layer to overhang significantly at the both ends of the printed matter. No cracks were found in the protective layer after exposure to environments of conditions 1 and 2.

According to the present invention, if the protective layer formed on the substrate is transferred by hot-press-bonding onto the surface of the printed matter, and thereafter the printed matter with the protective layer is stripped off from the substrate, the protective layer is cut cleanly along the edge of the printed matter. In addition, even though the printed matter on which the protective layer is formed is left standing in hot and humid surroundings, no cracks appear in the protective layer. In addition, the UV absorber is incorporated in this protective layer, whereby sufficient light-resistance can be provided.

What is claimed is:

1. A laminating method comprising the steps of:
   providing a laminating film having a surface layer and an adhesive layer disposed on the surface layer, with the layers being deposited on a substrate, and the surface layer being formed by applying at least two types of emulsions blended together to the substrate, wherein the surface layer can be separated from the substrate, the emulsions having emulsion polymers with different glass transition temperatures;
   press-bonding the laminating film to a printed matter at a temperature not less than the glass transition temperature of the emulsion polymer with a relatively high glass transition temperature, and
   separating the laminating film from the printed matter thereafter.

2. The laminating method according to claim 1, wherein the temperature at which the laminating film is separated from the printed matter is not less than the glass transition temperature of the emulsion polymer with a relatively low glass transition temperature and does not exceed the glass transition temperature of the emulsion polymer with the relatively high glass transition temperature.

3. A laminating film, comprising:
   a surface layer; and
   an adhesive layer disposed on said surface layer, with said layers being deposited on a substrate, wherein
      said surface layer is formed by applying at least two types of emulsions blended together to the substrate, and wherein
      said surface layer can be separated from the substrate.

4. The laminating film according to claim 3, wherein said emulsions include emulsion polymers different in glass transition temperatures.

5. The laminating film according to claim 3, wherein said coating contains at least two types of emulsion polymers different in glass transition temperatures, which temperatures are not less than 40° C.

6. The laminating film according to claim 5, wherein said emulsions include a first emulsion polymer with a glass transition temperature of 80° C. or more and a second emulsion polymer with a glass transition temperature of 30° C. or less.

7. The laminating film according to claim 4, wherein a solid content of said emulsion polymer with a relatively high glass transition temperature is 10 to 90% by weight of a solid content of all the emulsions.

8. The laminating film according to claim 3, wherein said surface layer has UV absorption.

9. The laminating film according to claim 3, wherein said adhesive layer has UV absorption.

10. The laminating film according to claim 3, wherein emulsion polymers in said emulsions have different minimum formation temperatures.

11. A laminating film, comprising:
    a surface layer; and
    an adhesive layer disposed on said surface layer, with said layers deposited on a substrate,
    wherein said surface layer is comprised of at least two types of resins and has an islands-in-sea structure in which a first resin forms islands in a sea of a second resin, and wherein
       said surface layer can be separated from the substrate.

12. The laminating film according to claim 11, wherein said second resin has a lower glass transition temperature than said first resin.

13. A laminating film, comprising:
    a surface layer; and
    an adhesive layer on said surface layer, with said layers deposited on a substrate, wherein said surface layer is comprised of at least two types of resins lacking a homogenous structure, and wherein
       said surface layer can be separated from the substrate.

* * * * *

UNITED STATES PATENT AND TRADEMARK OFFICE
CERTIFICATE OF CORRECTION

PATENT NO.    : 6,638,388 B2                                               Page 1 of 1
DATED         : October 28, 2003
INVENTOR(S)   : Toru Nagata et al.

It is certified that error appears in the above-identified patent and that said Letters Patent is hereby corrected as shown below:

Column 3,
Line 60, "last" should read -- least --.

Column 4,
Line 29, "(mata)" should read -- (meta) --.

Column 12,
Line 4, "am" should read -- an --.
Line 21, "am" should read -- an --.

Column 13,
Line 39, "laminateing" should read -- laminating --.
Line 51, "Nisshin" should read -- Nissin --.

Column 14,
Line 32, "38 $\mu$m The" should read -- 38 $\mu$m ¶ The --.

Signed and Sealed this

Fifteenth Day of June, 2004

JON W. DUDAS
*Acting Director of the United States Patent and Trademark Office*